March 30, 1948. J. M. B. MARANA 2,438,671
RESILIENT SEALING DISC FOR BOTTLE SEALS
Filed Aug. 14, 1944
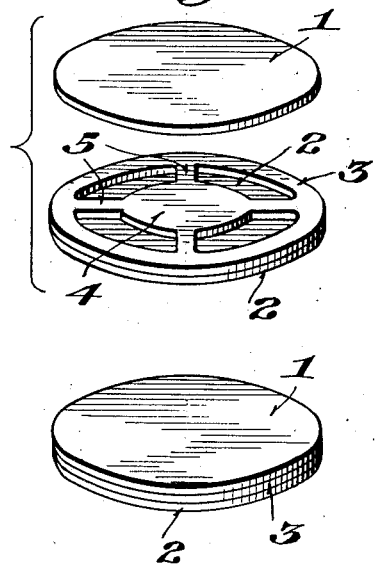
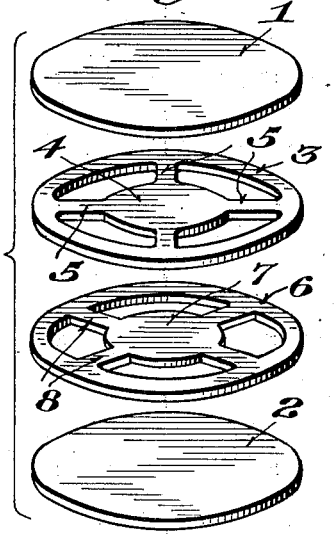
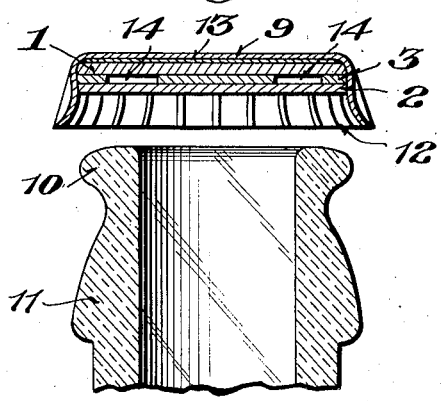
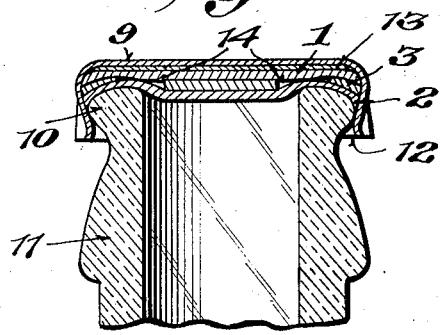
Inventor
Jose M. B. Marana,
By
Attorney Patented Mar. 30, 1948

2,438,671

UNITED STATES PATENT OFFICE 2,438,671

RESILIENT SEALING DISC FOR BOTTLE SEALS

José María Bolaño Marana, Buenos Aires, Argentina

Application August 14, 1944, Serial No. 549,357
In Argentina August 18, 1943

2 Claims. (Cl. 288—33)

This invention relates to an improvement in bottle caps of the type having a crimped marginal skirt portion, and has particular reference to a laminated sealing unit of resilient material.

One of the objects is to provide an interior sealing unit or seat in the form of a liner disc which may be made of layers of yieldable material having cut-out portions which provide graduated resiliency, as distinguished from a single solid unit which relies wholly on the resiliency of the material itself, as in the case of cork for example, in such a way that said resiliency or capacity to yield may be increased or decreased by selective arrangement of the laminations having cut-out portions. Therefore, in its primary aspect, the invention contemplates a resilient or yieldable cap liner formed by the joining of several layers of flexible material, adhesively connected, the inner sections or layers being provided with suitable openings which permit of flexing the covering or outer layers when the cap is applied to a mouth of a bottle. In that connection, the arrangement of the openings in the inner layer is such that flexure will take place in the zone of the periphery of the bottle mouth to which the cap and liner are applied.

A preferred and practical embodiment of the invention is shown in the accompanying drawings, in which:

Figure 1 is a perspective view illustrating one form of the invention;

Figure 1a is a perspective view of the completed laminated structure shown in Figure 1;

Figure 2 is a perspective view of the laminated sealing disc which includes a multiplicity of intermediate layers having cut-out portions;

Figure 3 is a vertical sectional view of the sealing cap and disc before application to a bottle.

Figure 4 is a vertical sectional view illustrating the cap and sealing disc of the present invention applied.

Similar reference characters designate corresponding parts in the several figures.

As will be observed from the drawings, the sealing disc preferably consists of imperforate outer layers 1 and 2 having therebetween a third layer 3, all of said layers being adhesively connected. The intermediate layer 3 is provided with suitable openings as illustrated in Figure 1. These openings may be of varying shape, but preferably are in the form of annular sectors arranged about a central annulus 4 with connecting webs 5 between the annulus and the periphery of the layer.

According to another arrangement, the intermediate layer, as shown in Figure 2, may be formed by two or more units 3 and 6, the same to be confined between the outer imperforate layers 1 and 2. By providing more or less intermediate perforate layers, it is possible to control the relative degree of softness or resiliency. In connection with Figure 2 it will be observed that the webs 5 and 8 radiating from the central annulus 4 are arranged to be out of registry when several intermediate layers are superimposed, thereby to secure more uniform distribution of the material over the hollow spaces or cut-out portions of the intermediate layers, when the device is applied.

Figure 3 illustrates the crown cap before it is applied to the bottle 11. The interior of the cap 9 is provided with a shoulder formed by the serrated flange or skirt 12, and the sealing disc formed between laminations 1, 2 and 3 is placed behind the shoulder formed by the serrations. A disc of paraffin paper 13 is preferably inserted between the disc or layer 1 and the interior of the metal cap. According to Figure 3, the intermediate layer 3 is formed with a single perforate section or layer having the openings or cavities 14.

Figure 4 illustrates the cap of Figure 3 applied to the mouth of a bottle. It will be seen that the rim of the bottle mouth displaces the material of the layer 2 towards the cavity 14 of the intermediate member 3, up to the point of sealing, at which time the metal cap or crown is tightly pressed on the bottle neck. The deformation in the intermediate layer 3 contributes to effecting a tight seal.

From the foregoing it will be seen that the present invention provides a liner disc or seat adapted to be made in such a way as to obtain the desired degree of resiliency for effectively sealing the mouth of a bottle.

I claim:

1. In a container cap, yieldable sealing means comprising a plurality of laminated layers of material, having top and bottom layers of imperforate material and intermediate perforate material, said perforate material comprising a disc having a circular imperforate center and an imperforate outer rim connected by webs, said webs being adapted to flex when capping pressure is applied thereto over the mouth of a container.

2. In a container cap, yieldable sealing means comprising a plurality of laminated layers of material, having top and bottom layers of imperforate material and intermediate perforate material, said perforate material comprising a plurality of perforate discs each having defined therein a circular imperforate center surrounded by an imperforate ring interconnected by spaced webs, said discs being superposed between the said imperforate layers, so as to stagger the positions of the webs of one disc with respect to the webs of the other.

JOSÉ MARÍA BOLAÑO MARANA.

REFERENCES CITED

The following references are of record in the file of this patent:

UNITED STATES PATENTS

| Number | Name | Date |
|---|---|---|
| 1,230,594 | Neumann | June 19, 1917 |
| 1,905,375 | Fischer | Apr. 25, 1933 |
| 1,945,308 | Fischer | Jan. 30, 1934 |